(12) United States Patent
Faroudja

(10) Patent No.: US 8,184,203 B1
(45) Date of Patent: May 22, 2012

(54) VIDEO ENHANCEMENT WITH SEPARATE AND DISTINCT METHODS OF ENHANCEMENT FOR SINGLE TRANSITIONS AND DOUBLE TRANSITIONS OF OPPOSITE POLARITY

(75) Inventor: Yves Faroudja, Mountain View, CA (US)

(73) Assignee: The Yves Faroudja Project, Mountain View, CA (US)

( * ) Notice: Subject to any disclaimer, the term of this patent is extended or adjusted under 35 U.S.C. 154(b) by 451 days.

(21) Appl. No.: 12/499,000

(22) Filed: Jul. 7, 2009

(51) Int. Cl.
 H04N 5/21 (2006.01)
 H04N 5/00 (2011.01)
 G06K 9/40 (2006.01)

(52) U.S. Cl. ........ 348/625; 348/606; 348/607; 382/254; 382/266; 382/275

(58) Field of Classification Search .......... 348/625, 348/606, E5.076, 607, E5.077; 382/254, 382/266, 275
See application file for complete search history.

(56) References Cited

U.S. PATENT DOCUMENTS

| | | | |
|---|---|---|---|
| 4,030,121 A | 6/1977 | Faroudja | |
| 4,041,531 A | 8/1977 | Bingham | |
| RE34,176 E | 2/1993 | Skinner et al. | |
| 5,237,414 A | 8/1993 | Faroudja | |
| 5,247,361 A | 9/1993 | Izawa et al. | |
| 6,233,022 B1 | 5/2001 | Weston et al. | |
| 6,867,817 B2 | 3/2005 | Bellers | |
| 2006/0001773 A1 | 1/2006 | Namioka | |
| 2006/0039622 A1 | 2/2006 | Casale et al. | |
| 2009/0201245 A1* | 8/2009 | Nonaka et al. | 345/102 |
| 2009/0316050 A1* | 12/2009 | Sahu et al. | 348/625 |

* cited by examiner

Primary Examiner — Hoang-Vu A Nguyen-Ba
(74) Attorney, Agent, or Firm — Convergent Law Group LLP

(57) ABSTRACT

A transition enhancement method and system for use with television or computer displays submits single transitions occurring in an input signal to a first transition enhancement process; and submits double transitions of opposite signs occurring in the input signal to a second transition enhancement process that is different from the first transition enhancement process.

17 Claims, 7 Drawing Sheets

VIDEO ENHANCEMENT WITH SEPARATE AND DISTINCT METHODS OF ENHANCEMENT FOR SINGLE TRANSITIONS AND DOUBLE TRANSITIONS OF OPPOSITE POLARITY

BACKGROUND

It has been a common practice in the field of video processing to increase the apparent sharpness of an image by means of linear or nonlinear enhancement. Linear type enhancement techniques achieve sharper edges, or transitions, in a video signal simply by increasing, by diverse means (adding a second derivative of the signal for example) the amplitude of the high frequencies of the video spectrum. These techniques are simple and effective, but often create undesirable artifacts around edges, such as ringing.

Nonlinear enhancement is a more effective approach and attempts to reduce the rise time of an edge, also referred to as a transition, of an object by adding a signal derived from components of a main path video via nonlinear means in such a way as to increase the apparent resolution of the image without introducing significant ringing artifacts. The spectrum of the resulting video transitions is in effect widened, while a linear enhancement does not widen the spectrum, but increases the amplitude of its high-end frequencies, without extending the spectrum towards higher frequencies.

Several issued patents illustrate the state of the art in nonlinear enhancement. U.S. Pat. No. 4,030,121 by Faroudja, for example, discloses a system for improving the sharpness of the television picture by shortening transition time of single transitions occurring in video signals. The original input video signal is amplified and differentiated twice into first and second differentiated waveforms. The first differentiated waveform is rectified and then multiplied by a function of the second differentiated waveform. The waveform produced by the multiplication is then added to a delayed input video signal to provide an output signal having shorter transition times.

Conventional nonlinear enhancement techniques operate quite well in practice and expand in practice the signal spectrum by giving the illusion of a bandwidth that has been increased by the equivalent of roughly a 50% or a ratio of 1.5 to 2. The result is a picture having apparent increased sharpness with a reasonably acceptable level of artifacts. Such enhancement processes can be applied in the vertical as well as horizontal domains.

However, most if not all video signals include successive transitions of opposite signs, one following the previous one in a close interval of time, which is referred to as a double transition. An example of a double transition is a pulse of bright video on a dark background. As conventional enhancement are optimized for single transitions, and do not perform well on double transitions, a need has arisen for a transition enhancement process where single transitions, as well as pulses or double transitions, are enhanced in a manner that simulates the appearance of a video signal of wider spectrum.

BRIEF SUMMARY

The exemplary embodiment provides methods and systems for transition enhancement that submit single transitions occurring in an input signal to a first transition enhancement process; and submits double transitions of opposite signs occurring in the input signal to a second transition enhancement process that is different from the first transition enhancement process.

According to the exemplary embodiments, when a double transition is detected, the first transition enhancement process may be switched off and replaced by the second transition enhancement process, which is not the same as the method of enhancement used for single transitions. In this way, double transitions, which are normally degraded or at least not improved by conventional single enhancement processes, are significantly improved and aid in giving the illusion of an input signal having a bandwidth higher than the bandwidth of the input signal (i.e., spectrum expansion). In a further embodiment, a double transition detector is provided that is capable of detecting the double transitions. In a further embodiment, a double transition enhancer is provided that effectively enhances double transitions. In one embodiment, the double transition process is applicable in horizontal and vertical domains and may be applied to enhancement of chroma-by-luminance or luminance-by-luminance, as well.

DETAILED DESCRIPTION

The exemplary embodiment relates to video transition enhancement. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

Figure 1:
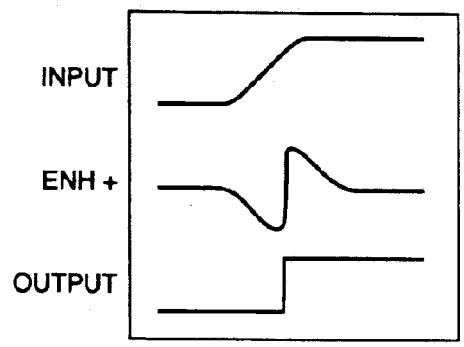
FIG. 1 is a diagram illustrating a conventional nonlinear enhancement process for an input video signal in a horizontal domain.

FIG. 1 is a diagram illustrating a conventional nonlinear enhancement process for an input video signal in a horizontal domain. The x-axis represents time and the y-axis represents amplitude. FIG. 1 shows a portion of the input signal containing a single transition, which is a signal rise or fall immediately followed by a flat portion. An example is a change from a black background to a white area in an image.

As described above, conventional nonlinear enhancement techniques have been developed for increasing the apparent sharpness of such a video signal without increasing its bandwidth. For example, on FIG. 1, the input signal (INPUT) may be passed through a circuit that enhances higher transition level components whereby the transition having limited bandwidth is enhanced by the addition of an enhancement signal (ENH+). The circuit produces an output transition (OUTPUT) that has a significantly increased apparent bandwidth due to a faster transition time. Such a single transition enhancement can be implemented in a variety ways and may have a variety of names, such as a spectrum expander circuit, a video crisprener and the like. See for example, U.S. Pat. Nos. 5,237,414 and 4,030,121, which are herein incorporated by reference.

Although this and other types of conventional nonlinear enhancement approaches are perfectly adequate for enhancing single transitions, such single transition enhancement approaches fail when used to process double transitions in the video signal. That is, when a video signal having both double and single transitions is processed using a conventional single transition enhancement process both positive going and negative going single transitions may be properly enhanced, but double transitions are degraded, which may result in ringing, widening of the pulse, and/or reduction in amplitude.

Figure 2A:
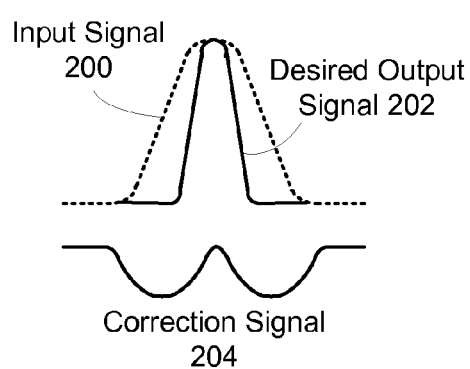
FIG. 2A is a diagram showing a portion of an input signal containing a double transition, and a desired output signal produced by applying a correction signal to the input signal in accordance with exemplary embodiments.
Figure 2B:
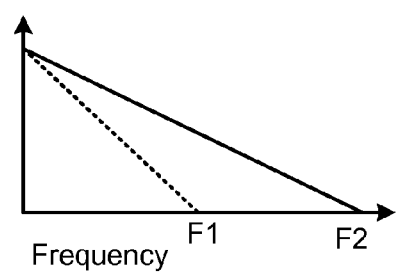
FIG. 2B is a graph comparing relative frequency spectra of the input signal and of the desired output signal.

FIG. 2A is a diagram showing a portion of an input signal 200 containing a double transition, and a desired output signal 202 produced by applying a correction signal 204 to the input signal 200 in accordance with exemplary embodiments. As in FIG. 1, the x-axis represents time and the y-axis represents amplitude. FIG. 2B is a graph comparing relative frequency spectra of the input signal 200 and the desired output signal 202.

As used herein, a double transition comprises successive transitions of opposite signs in an input signal, where a first transition is followed by a second transition in a substantially small interval of time, such that little or no flat portion of the input signal occurs in-between the two transitions. An example is a pulse in a video signal representing a white edge on a black background, where the signal changes from black to white and then from white to black.

The exemplary embodiments receive the input signal 200 and produce the desired output signal 202 by applying the correction signal 204 in accordance with the disclosed embodiments, described further below. The enhancement process results, for example, of the addition to the input signal with the correction signal 204, which could be, for example, a first derivative of the input signal, properly rectified and distorted by a non-linear process in order to obtain harmonics of such first derivative that are adjusted in amplitude and phase in order to reduce the rise/fall times (and increase the slopes) of the double transition to be enhanced, without inducing artifacts such as ringing, and/or widening or amplitude changes of the input signal 200.

As shown in FIG. 2A, applying the correction signal 204 to the input signal 200 produces a desired output signal 202 that has faster transition times (and steeper transition slopes). And as shown in FIG. 2B, the desired output signal 202 includes a relatively increased frequency bandwidth F2 over a frequency bandwidth F1 of the input signal 200, as the correction signal 204 is mostly composed of high frequencies created by rectification and controlled harmonic distortion.

Figure 3:
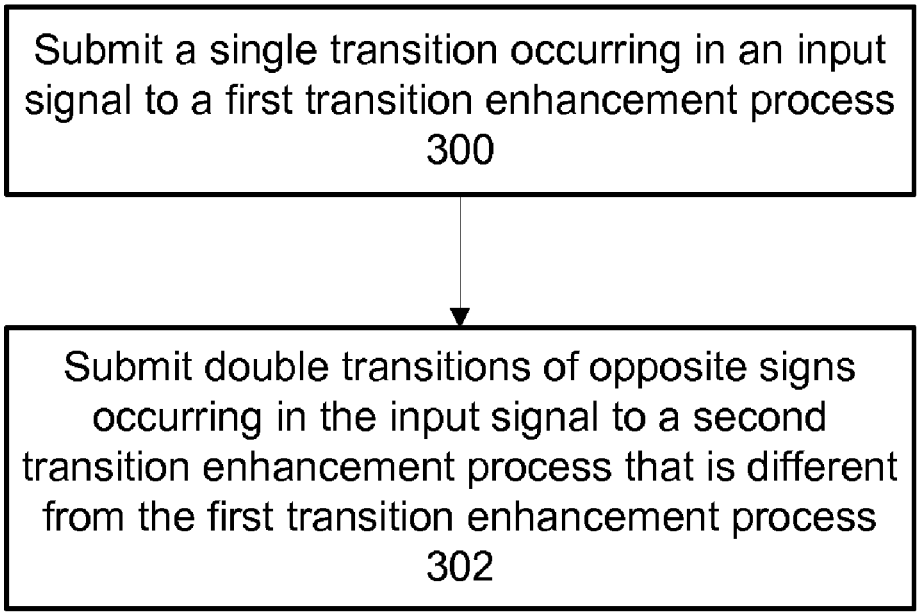
FIG. 3 is a flow diagram illustrating a combined transition enhancement process according to an exemplary embodiment.

FIG. 3 is a flow diagram illustrating a combined transition enhancement process according to an exemplary embodiment. The transition enhancement process is capable of enhancing both single and double transitions. In one embodiment, the transitions to be enhanced may occur in a video signal, or in any other electronic form of pictorial representation obtained by scanning.

The process may include submitting a single transition occurring in an input signal to a first transition enhancement process (block 300). In one embodiment, the first transition enhancement process may correspond to a single transition enhancement process. Any conventional approach may be used for implementing the single transition enhancement process. For example, the single enhancement process described with respect to FIG. 1 and described in U.S. Pat. No. 4,030,121, may be used. Other examples include the processes described in U.S. Pat. Nos. 5,237,414, 4,041,531, and the like.

The process may further include submitting a double transition of opposite signs occurring in the input signal to a second transition enhancement process that is different from the first transition enhancement process (block 302). In one embodiment, the second transition enhancement process may correspond to a double transition enhancement process described below. In one embodiment, the combined transition process may include receiving a selection signal, which in one embodiment, may be generated when a double transition is present in the input signal. The selection signal may be used to select the second transition enhancement process when double transitions are present, and to select the single transition process when double transitions are not present.

Figure 6:
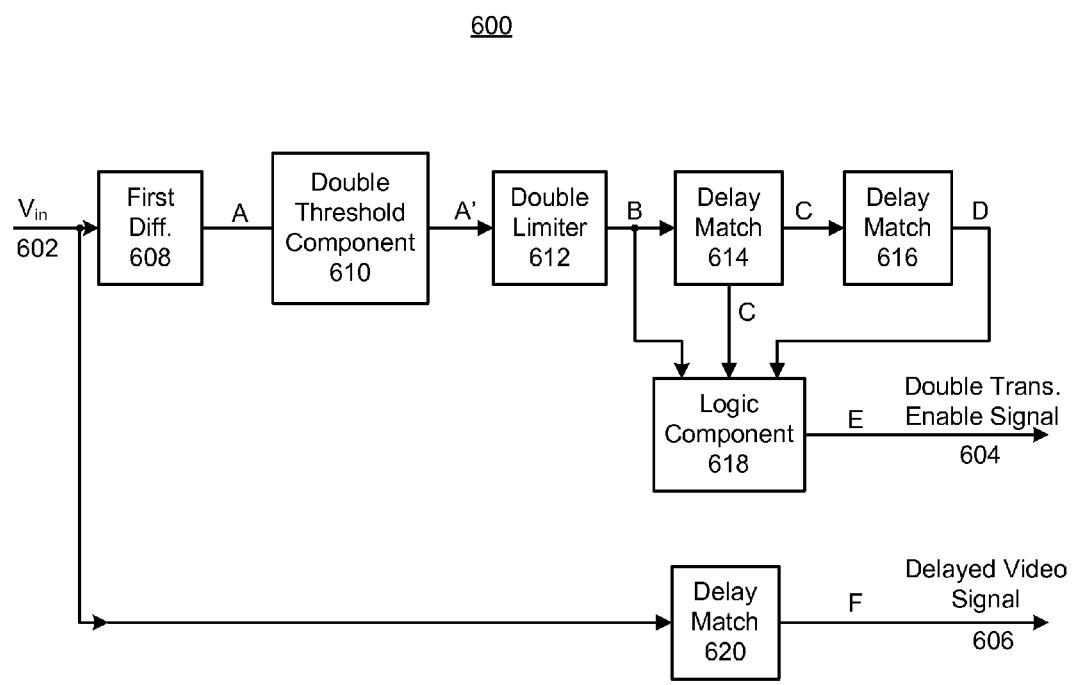
FIG. 6 is a block diagram illustrating a system implementation for a double transition detector that detects double transitions in an input signal and generates a selection signal.
Figure 7:
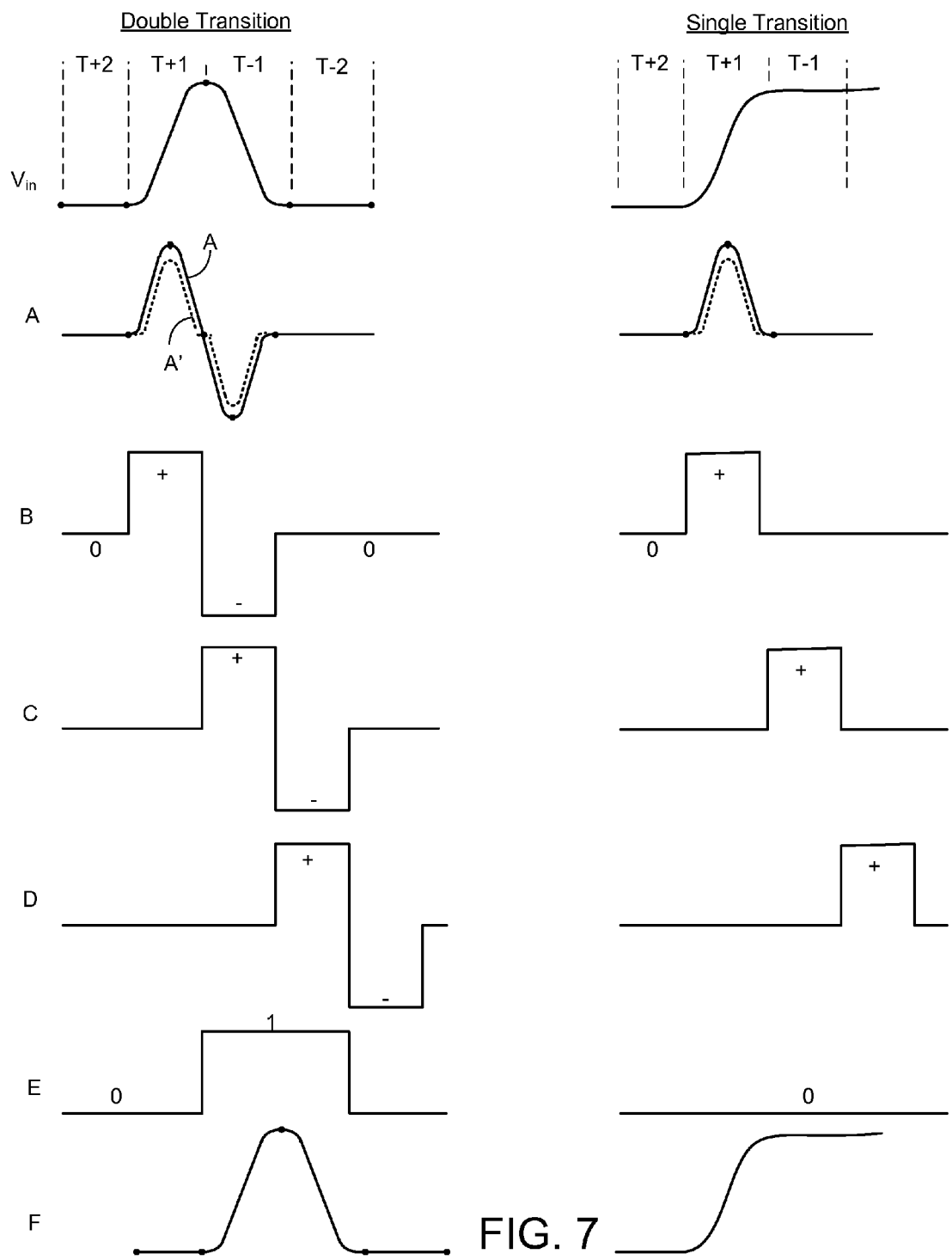
FIG. 7 is a waveform diagram of signals at various points of processing by the double transition detector of FIG. 6.

In another embodiment, the process may itself include a double transition detector that detects double transitions in the input signal, and generates the selection signal in response, as described in FIGS. 6 and 7, for example. In a further embodiment, a double transition enhancer is provided that enhances double transitions, as described in FIGS. 8 and 9.

According to the exemplary embodiment, when a double transition is detected, the single transition enhancement process may be switched off and replaced by the double transition enhancement process. In this way, double transitions, which are normally degraded or at least not improved by conventional single enhancement processes, are significantly improved and aid in giving the illusion of an input signal having a bandwidth higher than the bandwidth of the input signal (i.e., spectrum expansion). Thus, in one embodiment, the combined enhancement process detects double transitions of opposite signs, and in response, uses a method of enhancement for the double transitions that is not an the same as the method of enhancement used for single transitions.

In a further embodiment, the combined transition enhancement process is also applicable to enhancement of the input signal by another signal that is closely related to the input signal. In the case of a video signal, for example, which has chrominance (chroma) components (R-y, B-y) and a luminance (luma) component (Y), the transition enhancement process may be used to enhance the chroma components (R-y, B-y) by the luminance component (Y). The transition enhancement process may also be configured to enhance RGB, YUV, and YPbPr source signals in a like manner.

In one embodiment, chroma components of a video signal may be enhanced as follows. Double transitions may be first detected as described in FIGS. 6 and 7, for example, in the chroma component path, thereby identifying a double transition area of the chroma components. Outside of the double transition area, the chroma components may be enhanced using a single transition enhancement process as described in the prior art, chroma by chroma or chroma by luminance. Within the double transition area of the chroma components, the chroma components may be enhanced as described in FIGS. 8 and 9. In a further embodiment, the chroma component amplitude may be optionally modified during the double transition enhancement process for enhanced double transition chrominance to maintain visual chroma saturation as if unprocessed through compression/decompression transmission and standards, which may lower chroma bandwidth, thereby increasing transitions durations and reducing saturation in double transitions chroma areas.

In one embodiment, the combined enhancement process is applicable to enhancing transitions in the horizontal domain, but may be equally applicable to the vertical or temporal domain. The combined enhancement process may also apply to processes that may be multiplicative or not. The combined enhancement process is also applicable to the enhancement of luminance signals by luminance, chroma by chroma, and chroma by luminance.

Figure 4:
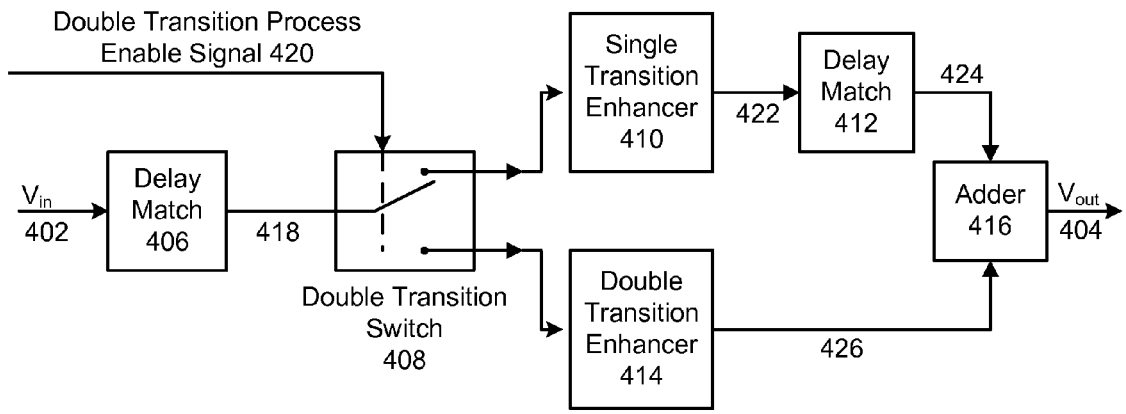
FIG. 4 is a block diagram illustrating a first embodiment for a system implementation of a combined transition enhancer.
Figure 5:
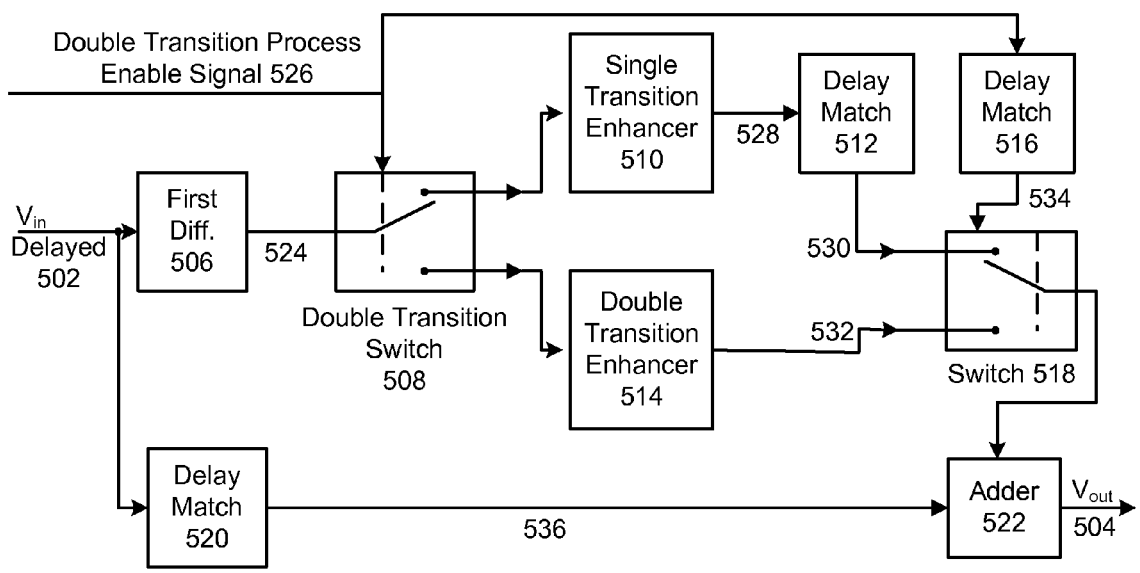
FIG. 5 is a block diagram illustrating the second system implementation of the combined transition enhancer.

FIGS. 4 and 5 are block diagrams illustrating a system for implementing a combined transition enhancer for enhancing both single and double transitions according to first and second embodiments, respectively.

FIG. 4 is a block diagram illustrating a first embodiment for a system implementation of a combined transition enhancer. The combined transition enhancer 400 receives, for example, a video signal 402 and produces an enhanced video output signal 404. In this embodiment, the combined transition enhancer 400 includes a first delay match 406, a double transition switch 408, a single transition enhancer 410, a second delay match 412, a double transition enhancer 414, and an adder 416.

The first delay match 406 is connected to receive video signal 402 and delays the video signal 402 by a predetermined interval in order to match a delay of a selection signal, referred to here as a double transition process enable signal 420, to produce a delayed video signal 418. The delayed video signal 418 is input to the double transition switch 408 along with the double transition process enable signal 420

In one embodiment, the double transition process enable signal 420 may be active when double transitions are detected in the video signal 402. When the double transition process enable signal 420 is not active, the double transition switch 408 may switch the delayed video signal 418 to the single transition enhancer 410. The single transition enhancer 410 produces a first enhanced signal 422, which is received by the second delay match 412 and output as a delayed first enhanced signal 424.

When the double transition process enable signal 420 is active, the double transition switch 408 may switch the delayed video signal 418 to the double transition enhancer 414. The double transition enhancer 414 applies a correction signal to the delayed video signal 418 and produces a second enhanced signal 426 (e.g., desired output signal 202 of FIG. 2B), which is then combined in the adder 416 with the delayed first corrected signal 424. The adder then outputs the enhanced video output signal 404.

In FIG. 4, both the single transition enhancer 410 and the double transition enhancer 414 may be implemented to include a first differential processing step. The second system implementation of the combined transition enhancer removes the first differential processing step from the single transition enhancer 410 and the double transition enhancer 414 and instead performs the first differential processing step on the input video signal prior to the video signal being input into the single and double transition enhancers 410 and 414, as shown in FIG. 5.

FIG. 5 is a block diagram illustrating the second system implementation of the combined transition enhancer. The combined transition enhancer 500 receives a delayed video signal 502 and produces an enhanced video output signal 504. In this embodiment, the combined transition enhancer 500 includes a first differentiator 506, a double transition switch 508, a single transition enhancer 510, a first delay match 512, a double transition enhancer 514, a second delay match 516, a switch 518, a third delay match 520, and an adder 522.

The first differentiator 506 is connected to receive the delayed video signal 502 and provides a differentiated signal 524. The double transition switch 508 receives both the differentiated signal 524 and a double transition process enable signal 526. When the double transition process enable signal 526 is not active, the double transition switch 508 may switch the differentiated signal 524 to the single transition enhancer 510. The single transition enhancer 510 produces a first enhancement signal 528, which is received by the first delay match 512 and output as a delayed first enhancement signal 530.

When the double transition process enable signal 526 is active, the double transition switch 508 may switch the differentiated signal 524 to the double transition enhancer 514. The double transition enhancer 514 produces a second enhancement signal 532. The double transition process enable signal 526 is also received by the second delay match 516 that delays the double transition process enable signal 526 by a predetermined interval in order to match the delays of the single and double enhancement paths to produce a delayed double transition process enable signal 534.

The switch 518 receives the delayed first enhancement signal 530 and the second enhancement signal 532 and based on a value of the delayed double transition process enable signal 534, outputs either the delayed first enhancement signal 530 or the second enhancement signal 532 to the adder 522.

The delayed video signal 502 is also received by the third delay match 520 that further delays the delayed video signal 502 by a predetermined interval in order to match the delay of the single and double enhancement paths to produce a double delayed video signal 536. The adder 522 receives and combines the double delayed video signal 536 and either the delayed first enhancement signal 530 or the second enhancement signal 532 from the switch 518 to produce the enhanced video output signal 504.

In the second subsystem implementation of the combined transition enhancer shown in FIG. 5, a single first differentiation 506 is used for both enhancement paths, instead of two separate ones, as may be used in 410 and 414 of FIG. 4. In FIG. 5, the main video path is separated from the enhancement path at the input (520) and enhancement is added in 522. In FIG. 4, the un-enhanced main video path goes through two enhancement paths. In one embodiment, the terms first and second enhanced signals 422 and 424 of FIG. 4 are referred to as "enhanced" signals because they include both the main (unenhanced) video path and enhancement waveforms, while the first and second enhancement signals 528 and 532 of FIG. 5 are referred to as "enhancement" signals because they do not include the main (unenhanced) video path, just the enhancement waveforms. However, in some embodiments, the terms enhanced signal and enhancement signal may be used interchangeable.

FIG. 6 is a block diagram illustrating a system implementation for a double transition detector that detects double transitions in an input signal and generates a selection signal, e.g., the double transition process enable signal. In one embodiment, the double transition detector 600 generates the selection signal by differentiating the input signal, producing a differentiated input signal. Positive and negative excursions of the differentiated input signal are then converted into a plurality of digital signals, which are successively delayed by one time period each. The double transition detector 600 examines the plurality of digital signals and activates the selection signal only if at least two of the plurality digital signals are not zero.

In further detail, the double transition detector 600 may receive a video signal 602, and may output both a double transition enable signal 604 and a delayed video signal 606. In this embodiment, the double transition detection 600 may include a first differentiator 608, a double threshold component 610, a double limiter 612, a first delay match 614, a second delay match 616, a logic component 618, and a third delay match 620.

FIG. 7 is a waveform diagram of signals at various points of processing by the double transition detector of FIG. 6. Referring to FIGS. 6 and 7, the double transition detection 600 is connected to receive the video signal 602, which may include double transitions and single transitions. When a portion of the video signal 602 that includes a double transition is processed, the waveforms appear as shown on the left-hand side of FIG. 7. When a portion of the video signal 602 that includes a single transition is processed, the waveforms appear as shown on the right-hand side of FIG. 7.

As shown, a double transition is flat during time period t+2, has a rising or falling transition during time period t+1, a falling or rising transition during time period t−1, and is flat again during time period t−2. A single transition, in contrast, is flat during time period t+2, has a rising/falling transition during time period t+1, and is flat again for at least one more time period t−1.

The first differentiator 608 receives the video signal 602 and provides a differentiated output, waveform A. The double threshold component 610 receives waveform A and places thresholds on the positive and negative excursions of the differentiated waveform A to produce a thresholded output, waveform A'. One function of the double threshold component 610 is to protect the double transition enable signal 604 from undesirable random switching due to video noise. The double limiter 612 amplifies and limits positive and negative excursions of waveform A' and produces a flat top waveform B, which is output and received by both the first delay match 614 and the logic component 618. The first delay match 614 delays waveform B a first time period to produce waveform C. The second delay match 616 delays waveform C another time period to produce waveform D.

To determine if a current portion of the video signal 602 includes a double transition or single transition, waveforms B, C, and D, are input to the logic component 618. In one embodiment, the logic component 618 may be configured to examine plus and minus amplitudes of each of the waveforms B, C, and D overtime, including during time periods t+2, t+1, t−1 and t−2. In one embodiment, logic component 618 may generate a 1 only if at least two of waveforms B, C, and D are not zero (e.g., 1 or −1), and generates a 0 (zero) if none or only one of the waveforms B, C, and D are not zero. As a consequence, for a double transition, successive values of waveforms B, C, and D, the possible outputs of logic component 618 are:

|        | Time → |    |    |    |    |   |
|--------|--------|----|----|----|----|---|
| B      | 0      | 1  | −1 | 0  | 0  | 0 |
| C      | 0      | 0  | 1  | −1 | 0  | 0 |
| D      | 0      | 0  | 0  | 1  | −1 | 0 |
| Output | 0      | 0  | 1  | 1  | 0  | 0 |

And for a single transition, the successive values of waveforms B, C, and D, the possible outputs of logic component 618 are:

|        | Time → |   |   |   |   |   |
|--------|--------|---|---|---|---|---|
| B      | 0      | 1 | 0 | 0 | 0 | 0 |
| C      | 0      | 0 | 1 | 0 | 0 | 0 |
| D      | 0      | 0 | 0 | 1 | 0 | 0 |
| Output | 0      | 0 | 0 | 0 | 0 | 0 |

The logic component 618 activates the double transition enable signal 604 by outputting waveform E, for example, only when a double transition occurs. The implementation details of logic component 618 are outside the scope of this document.

The video signal 602 is also input to a third delay match 620 In order to match the delay of the video signal 602 to the double transition enable signal 604, producing waveform F, a delayed video signal 606.

When the double transition detection 600 is implemented with the combined transition enhancement process of FIG. 4, the third delay match 620 in FIG. 6 and the first delay match 406 in FIG. 4 may be the same. Similarly, when the double transition detection 600 is implemented with the combined transition enhancement process of FIG. 5, the delayed video signal 606 may be the same as the delayed video signal 502.

Figure 8:
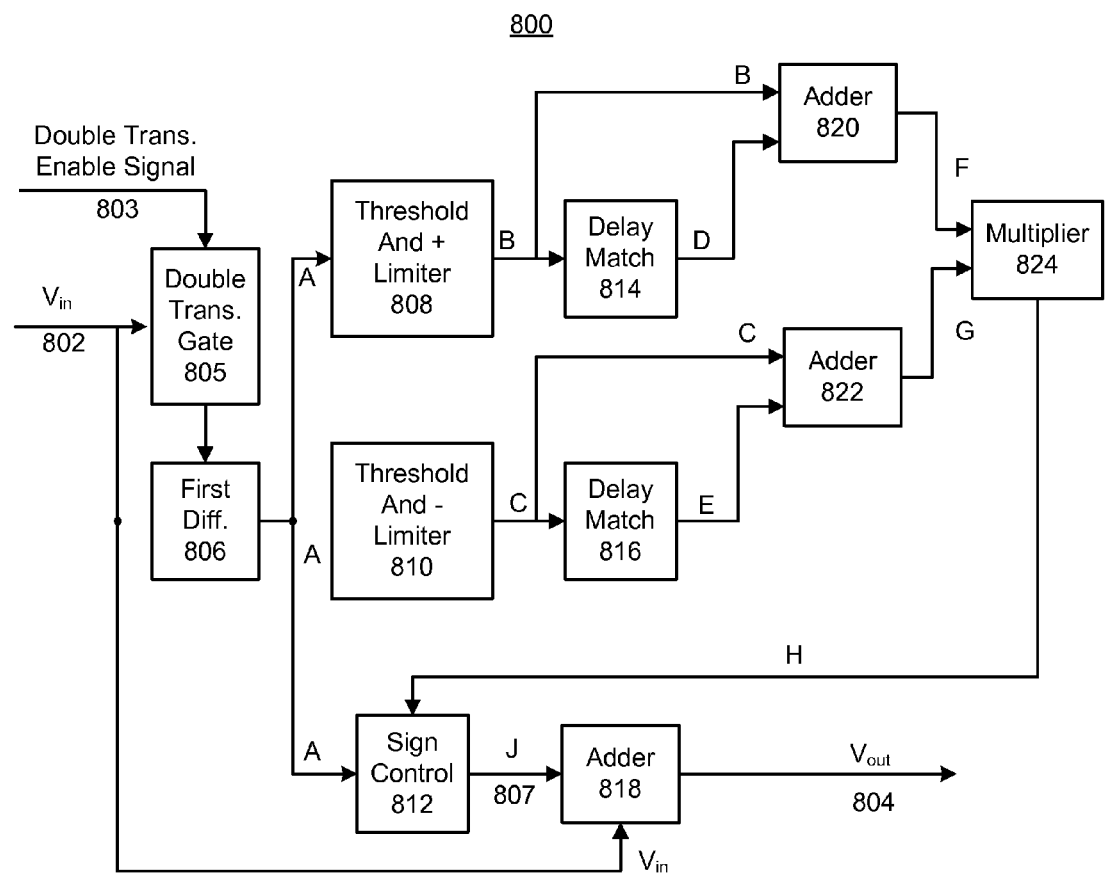
FIG. 8 is a block diagram illustrating one example system implementation of the double transition enhancer of FIG. 4.

FIG. 8 is a block diagram illustrating one example system implementation of the double transition enhancer 414 of FIG. 4. The double transition enhancer 800 receives an input signal 802 having a double transition and produces an enhanced signal 804 in which the double transitions are made faster (i.e., the slopes of the double transitions are made steeper), and the relative frequency bandwidth of the enhanced signal 804 is increased.

According to the exemplary embodiment, the enhanced signal 804 is generated by adding to the input signal 802 a correction signal 807. In one embodiment, the correction signal 807 may be generated by producing a first derivative of the input signal. This first derivative may be rectified and distorted by a non-linear process to obtain harmonics of such first derivative that are adjusted in amplitude and phase in order to reduce the rise/fall times (and increase the slopes) of the double transition to be enhanced, without inducing artifacts such as ringing, and/or widening or amplitude changes of the input signal 200. The enhanced signal 804 is then generated and output by adding the correction signal 807 to the input signal.

In one embodiment, the double transition enhancer 800 includes a double transition gate 805, a first differentiator 806, a threshold and positive limiter 808, a threshold and negative limiter 810, a sign control 812, first and second delay matches 816, a first adder 818, a second adder 820, a third adder 822, and a multiplier 824.

Figure 9:
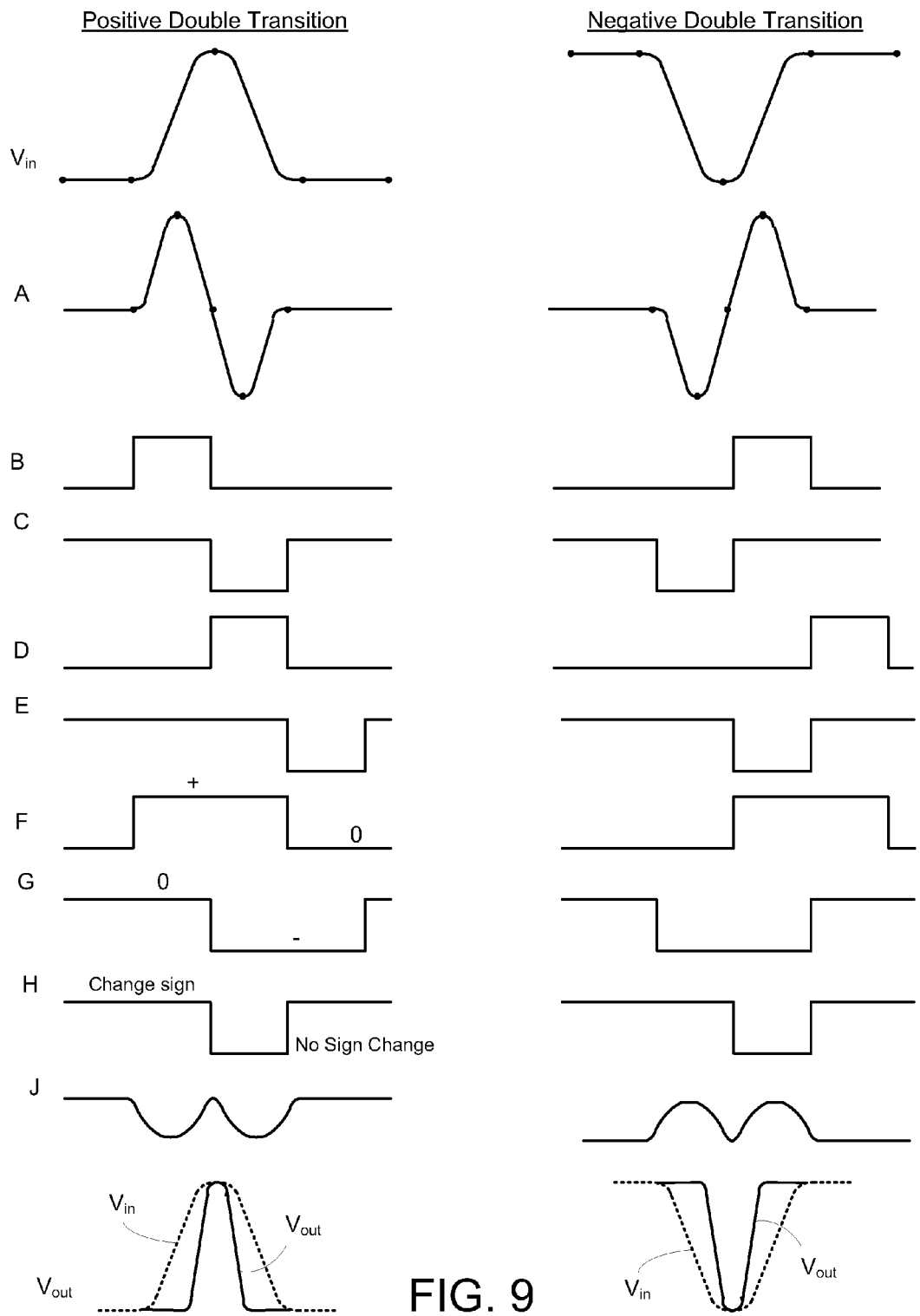
FIG. 9 is a waveform diagram of signals at various points of processing by the double transition enhancer of FIG. 8.

FIG. 9 is a waveform diagram of signals at various points of processing by the double transition enhancer 800 of FIG. 8. The left-hand side of FIG. 8 shows the waveforms generated during the processing of a positive double transition or pulse, while the right-hand side of FIG. 8 shows the waveforms generated during the processing of a negative double transition or pulse.

Referring to both FIGS. 8 and 9, the double transition gate 805 is connected to receive both the input signal 802 and the double transition enable signal 803. If the double transition enable signal 803 is active, the double transition gate 805 outputs the input signal 802 to the first differentiator 806. The first differentiator 806 produces a differentiated output, waveform A, which is output and received by a threshold and positive limiter means and a threshold and negative limiter means, and the sign control 812. For example, the threshold and positive limiter means may include the threshold and positive limiter 808, the delay match 814 and the second adder 820. The threshold and negative limiter means may include the threshold and negative limiter 810, the second delay match 816 and the third adder 822.

The threshold and positive limiter 808 limits the positive amplitude of waveform A and blocks the negative amplitude to produce and output a flat top waveform B. The threshold and negative limiter 810 limits the negative attitude of waveform A and blocks the positive amplitude to produce and output flat top waveform C.

Waveform B is output and received by both the first delay match 814 and the second adder 820. The first delay match 814 delays waveform B one time period to produce waveform D, which is also output to the second adder 820.

Waveform C is output and received by both the second delay match 816 and the third adder 822. The second delay match 816 delays waveform C one time period to produce waveform E, which is also output to the third adder 822.

The second adder 820 combines waveform B and waveform D and outputs waveform F to the multiplier 824. Similarly, the third adder 822 combines waveform C and waveform E and outputs waveform G to the multiplier 824. The multiplier 824 multiplies waveform F and waveform G and outputs waveform H to the sign control 812.

The sign control 812 receives waveform A and waveform H and in order to change the sign of a first half of differentiated waveform A, to produce correction signal 807, as waveform J. The third adder combines the correction waveform J and the input signal 802 to produce an enhanced signal 804 having faster transitions.

A method and system for enhancing video transitions has been disclosed. The present invention has been described in accordance with the embodiments shown, and there could be variations to the embodiments, and any variations would be within the spirit and scope of the present invention.

For example, the combined transition enhancer in both FIGS. 4 and 5, the double transition detector of FIG. 6, and the double transition enhancer of FIG. 8 may be implemented using hardware, a computer readable medium containing software program instructions, or a combination of both. Software written according to the exemplary embodiment is to be either stored in some form of computer-readable medium such as a memory, a hard disk, or a CD/DVD-ROM and is to be executed by a processor in a computer. Accordingly, many modifications may be made by one of ordinary skill in the art without departing from the spirit and scope of the appended claims.

I claim:

1. A transition enhancement process performed by at least one of hardware and software program instructions stored on a non-transitory computer readable medium and executed by a processor, comprising:
   submitting single transitions occurring in an input signal to a first transition enhancement process;
   submitting double transitions of opposite signs occurring in the input signal to a second transition enhancement process that is different from the first transition enhancement process; and
   using a selection signal to select the second transition enhancement process when the double transitions are present, and to select the first transition enhancement process when the double transitions are not present.

2. The method of claim 1 further comprising generating the selection signal by:
   differentiating the input signal, producing a differentiated input signal;
   converting positive and negative excursions of the differentiated input signal into a plurality of digital signals;
   successively delaying the plurality of digital signals by one time period each; and
   activating the selection signal only if at least two of the plurality digital signals are not zero.

3. The method of claim 2 generating the selection signal further comprises:
   producing a differentiated waveform A from the input signal;
   placing thresholds on the positive and negative excursions of differentiated waveform A and producing a thresholded output waveform A';
   amplifying and limiting positive and negative excursions of waveform A' and producing a flat top waveform B;
   delaying the flat top waveform B a first time period to produce waveform C, and delaying waveform C another time period to produce waveform D; and
   activating the selection signal only if at least two of waveforms B, C, and D are not zero.

4. The method of claim 1 further comprising performing the second transition enhancement process by:
   differentiating the input signal to produce a differentiated output, waveform A;
   outputting waveform A to a threshold and positive limiter to produce waveform B, delaying waveform B one time period to produce waveform D, and outputting waveform D;
   outputting waveform A to a threshold and negative limiter to produce waveform C, delaying waveform C another time period to produce waveform E, and outputting waveform E;
   combining waveform C and waveform E and producing waveform G, and combining waveform B and waveform D to produce waveform F;
   multiplying waveform F and waveform G and produce waveform H;
   sign controlling waveform A and waveform H to change the sign of a first half of differentiated waveform A, thereby, producing a correction signal; and
   adding the correction signal to the input signal.

5. The method of claim 1 further comprising performing the first and second transition enhancement processes in a horizontal domain.

6. The method of claim 1 further comprising performing the first and second transition enhancement processes in a vertical domain.

7. The method of claim 1 further comprising enhancing chrominance components in the input signal by a luminance component.

8. The method of claim 7 further comprising modifying amplitudes of the chrominance components for enhanced double transition chrominance.

9. A transition enhancer comprising at least one of hardware and software program instructions stored on a non-transitory computer readable medium and executed by a processor, comprising:
 a first transition enhancer for processing single transitions occurring in an input signal;
 a second transition enhancer for processing double transitions, wherein the processing of the second transition enhancer is different from the processing of the first transition enhancer; and
 a switch that receives a selection signal and uses the selection signal to select the second transition enhancer when the double transitions are present, and to select the first transition enhancer when the double transitions are not present.

10. The transition enhancer of claim 9 further comprising a double transition detector that generates the selection signal by:
 differentiating the input signal, producing a differentiated input signal;
 converting positive and negative excursions of the differentiated input signal into a plurality of digital signals;
 successively delaying the plurality of digital signals by one time period each; and
 activating the selection signal only if at least two of the plurality of digital signals are not zero.

11. The transition enhancer of claim 10 wherein the double transition detector is further configured to:
 produce a differentiated waveform A from the input signal;
 place thresholds on positive and negative excursions of differentiated waveform A and produce a thresholded output waveform A';
 amplify and limiting positive and negative excursions of waveform A' and produce a flat top waveform B;
 delay the flat top waveform B a first time period to produce waveform C, and delaying waveform C another time period to produce waveform D; and
 activate the selection signal only if at least two of waveforms B, C, and D are not zero.

12. The transition enhancer of claim 9 wherein the second transition enhancer enhances the double transitions by:
 producing a first derivative of the input signal;
 rectifying and distorting the first derivative by a nonlinear process to obtain harmonics of the first derivative that are adjusted in amplitude and phase in order to reduce rise and fall times of the double transitions to be enhanced, thereby generating a correction signal; and
 generating an enhanced signal by adding the correction signal to the input signal, and outputting the enhanced signal.

13. The transition enhancer of claim 9 wherein the first and second transition enhancements are performed in a horizontal domain.

14. The transition enhancer of claim 9 wherein the first and second transition enhancements are performed in a vertical domain.

15. The transition enhancer of claim 9 wherein chrominance components are enhanced in the input signal by a luminance component.

16. The transition enhancer of claim 15 wherein amplitudes of the chrominance components are modified for enhanced double transition chrominance.

17. A method for enhancing a double transition in an input signal, comprising:
 producing a first derivative of the double transition in the input signal;
 rectifying and distorting the first derivative by a nonlinear process to obtain harmonics of the first derivative that are adjusted in amplitude and phase in order to reduce rise and fall times of the double transition to be enhanced, thereby generating a correction signal; and
 generating an enhanced signal by adding the correction signal to the input signal, and outputting the enhanced signal.

* * * * *